(12) United States Patent
Kiyanagii et al.

(10) Patent No.: US 7,551,678 B2
(45) Date of Patent: Jun. 23, 2009

(54) OFDM TRANSCEIVER APPARATUS

(75) Inventors: Hiroyuki Kiyanagii, Sapporo (JP); Mitsuo Kobayashi, Sapporo (JP); Shinya Ohkawa, Sendai (JP); Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 345 days.

(21) Appl. No.: 11/094,783

(22) Filed: Mar. 30, 2005

(65) Prior Publication Data
US 2005/0190848 A1    Sep. 1, 2005

Related U.S. Application Data

(63) Continuation of application No. PCT/JP02/13261, filed on Dec. 19, 2002.

(51) Int. Cl.
*H04K 1/10* (2006.01)
(52) U.S. Cl. .................. 375/260; 375/340; 375/346
(58) Field of Classification Search .............. 375/260, 375/267
See application file for complete search history.

(56) References Cited

U.S. PATENT DOCUMENTS

| | | | | |
|---|---|---|---|---|
| 4,367,555 | A * | 1/1983 | Namiki et al. | 375/229 |
| 4,479,258 | A | 10/1984 | Namiki | |
| 4,577,330 | A * | 3/1986 | Kavehrad | 375/235 |
| 4,727,534 | A | 2/1988 | Debus, Jr. et al. | |
| 5,694,389 | A * | 12/1997 | Seki et al. | 370/208 |
| 5,796,814 | A | 8/1998 | Brajal et al. | |
| 5,838,740 | A * | 11/1998 | Kallman et al. | 375/346 |
| 6,470,005 | B1 * | 10/2002 | Knutson et al. | 370/347 |
| 7,039,137 | B1 * | 5/2006 | Lauterjung et al. | 375/349 |
| 7,099,265 | B2 * | 8/2006 | Kuwabara et al. | 370/203 |
| 2002/0018483 | A1 * | 2/2002 | Kuwabara et al. | 370/430 |
| 2002/0159532 | A1 * | 10/2002 | Wight | 375/260 |
| 2002/0191535 | A1 * | 12/2002 | Sugiyama et al. | 370/208 |
| 2003/0078075 | A1 * | 4/2003 | McNicol | 455/562 |
| 2006/0002288 | A1 * | 1/2006 | Okada et al. | 370/208 |
| 2007/0060058 | A1 * | 3/2007 | Shattil | 455/63.1 |

FOREIGN PATENT DOCUMENTS

| | | |
|---|---|---|
| JP | 58-56545 | 4/1983 |
| JP | 61-005642 | 1/1986 |
| JP | 61-24339 | 2/1986 |
| JP | 63-50231 | 3/1988 |
| JP | 2-246538 | 10/1990 |

(Continued)

OTHER PUBLICATIONS

Masahiro Takahashi et al. "Cross Polarization Interference Canceler for Microcellular Mobile Communication Systems", IEEE 1995.*

*Primary Examiner*—David C Payne
*Assistant Examiner*—Leon Flores
(74) *Attorney, Agent, or Firm*—Katten Muchin Rosenman LLP

(57) ABSTRACT

In an OFDM transmitter apparatus for transmitting transmit signals, which are output from first and second OFDM transmit circuits, utilizing two mutually orthogonal polarized waves, a single carrier wave generator is provided in common for the OFDM transmit circuits, and a frequency converter in each OFDM transmit circuit multiplies a baseband signal by a common carrier wave, which is output from the carrier wave generator, to convert the baseband signal to a radio signal.

3 Claims, 11 Drawing Sheets

FOREIGN PATENT DOCUMENTS

| | | |
|---|---|---|
| JP | 3-248643 | 11/1991 |
| JP | 5-048567 | 2/1993 |
| JP | 6-181464 | 6/1994 |
| JP | 8-340315 | 12/1996 |
| JP | 2000-022661 | 1/2000 |
| JP | 2000-165339 | 6/2000 |
| JP | 2000-183845 | 6/2000 |
| JP | 2001-345777 | 12/2001 |
| WO | WO 94/13077 | 6/1994 |

* cited by examiner

OFDM TRANSCEIVER APPARATUS

CROSS-REFERENCE TO RELATED APPLICATION

This application is a continuation of International Application PCT/JP02/13261 filed on Dec. 19, 2002, now pending, the contents of which are herein wholly incorporated by reference.

BACKGROUND OF THE INVENTION

This invention relates to an Orthogonal Frequency Division Multiplex (OFDM) transceiver apparatus and, more particularly, to an OFDM transmitter apparatus and OFDM receiver apparatus for performing OFDM communication utilizing a plurality of polarized waves.

In wideband wireless communications, frequency-selective fading ascribable to a multipath environment occurs. A useful scheme for dealing with this is multicarrier modulation, which divides the transmission band into a plurality of narrow bands (carriers) and transmits them in parallel in such a manner that frequency-selective fading will not occur. At present, specifications relating to digital TV/audio broadcasting (Japan and Europe) and wireless LAN (IEEE 802.11a) are being standardized with the Orthogonal Frequency Division Multiplex (OFDM) transmission scheme, which is one type of multicarrier modulation scheme, as the base. Further, OFDM-based modulation schemes have been proposed even in next-generating mobile communication systems.

In FIG. 9, (a) is a schematic structural view of a multicarrier transmission scheme. A serial/parallel converter 1 converts serial data to parallel data and inputs the parallel data to quadrature modulators 3a to 3d via low-pass filters 2a to 2d, respectively. In the Figure, the conversion is to parallel data comprising four symbols S1 to S4. Each symbol includes an in-phase component and a quadrature component. The quadrature modulators 3a to 3d subject each of the symbols to quadrature modulation by carriers having frequencies $f_1$ to $f_4$ illustrated in (b) of FIG. 9, a combiner 4 combines the quadrature-modulated signals and a transmitter (not shown) up-converts the combined signal to a high-frequency signal and then transmits the high-frequency signal. With the multicarrier transmission scheme, the frequencies are arranged, as shown at (b) of FIG. 9, in such a manner that the spectrums will not overlap in order to satisfy the orthogonality of the carriers.

In Orthogonal Frequency Division Multiplex (OFDM) transmission, frequency spacing is arranged so as to null the correlation between a modulation band signal transmitted by an nth carrier of a multicarrier transmission and a modulation band signal transmitted by an (n+1)th carrier. FIG. 10(a) is a diagram of the structure of a transmitting apparatus that relies upon the OFDM transmission scheme. A serial/parallel converter 5 converts serial data to parallel data comprising M-number of symbols. An IFFT (Inverse Fast Fourier Transform) 6, which is for the purpose of transmitting the M-number of symbols as carriers having a frequency spacing shown at (b) of FIG. 10, applies an inverse discrete Fourier transform to the frequency data to effect a conversion to time data. A guard interval inserting unit 7 inserts a guard interval GI and inputs real and imaginary parts to a quadrature modulator 9 through low-pass filters 8a, 8b. The quadrature modulator 9 subjects the input data to quadrature modulation, and a transmitter (not shown) up-converts the modulated signal to a high-frequency signal. In accordance with an OFDM transmission scheme, a frequency placement of the kind shown at (b) of FIG. 10 becomes possible, thereby enabling an improvement in the efficiency with which frequency is utilized.

FIG. 11 is a diagram showing the conventional structure of an Orthogonal Frequency Division Multiplex (OFDM) communication apparatus, in which TR and RV represent transmit and receive channels. On the transmit channel TR, a serial/parallel (S/P) converter 10 converts transmit data, which enters in a serial format, to M-bit parallel data, and a mapping unit 11 maps the M-bit parallel data to N-number of carriers based upon a modulation scheme of each carrier. For example, if it is assumed that QPSK modulation is performed by all carriers, the M-bit parallel data is divided into N-sets of two bits each and the 2-bit data of the N sets obtained by division is mapped to each carrier. FIG. 12 is a diagram useful in describing carrier placement. Here carriers for transmitting a pilot have been inserted.

FIG. 13 is a diagram of signal-point placement for describing mapping. Here (a) is a case where BPSK modulation is performed, and one bit ($b_0$) at a time is mapped to a carrier; (b) is a case where QPSK modulation is performed, and two bits ($b_0 b_1$) at a time are mapped to a carrier; (c) is a case where 16 QAM modulation is performed, and four bits ($b_0 b_1 b_2 b_3$) at a time are mapped to a carrier; and (d) is a case where 64 QAM modulation is performed, and six bits ($b_0 b_1 b_2 b_3 b_4 b_5$) at a time are mapped to a carrier.

Returning to FIG. 11, an IFFT arithmetic unit 12 applies IFFT processing to the symbol data of N carriers to convert the data to two time waveform signals (PCM waveform signals) of a real number (Ich component) and imaginary number (Qch component). A guard interval inserting unit 13 inserts a GI (Guard Interval) into each signal, and a waveshaping unit 14 shapes the waveforms and inputs the results to an IQ modulator (QPSK quadrature modulator) 15. The latter applies quadrature modulation to the Ich signal and Qch signal input thereto, and a mixer 16 multiplies the modulated signal of the baseband by a high-frequency carrier wave that enters from a carrier wave generator 17, thereby performing a frequency conversion. A transmit amplifier 18 amplifies the transmit signal and transmits the amplified signal from an antenna ATT.

On the receive channel RV, a high-frequency amplifier 20 of a radio unit amplifies a receive signal from an antenna ATR, and a mixer 21 multiplies the receive signal by a high-frequency carrier wave that enters from a carrier wave generator 22, thereby effecting a frequency conversion to a baseband signal, and inputs the signal to an IQ demodulator (QPSK quadrature demodulator) 23. The latter subjects the input signal to quadrature demodulation to demodulate and output the Ich signal and Qch signal. A waveshaping unit 24 shapes each of the waveforms and inputs the results to a rotator 25. The latter detects phase-error information from a known pilot signal and rotates phase in such a manner that the phase error becomes zero. A GI removing unit 26 removes the GI (Guard Interval) from the input signal of each component, and an FFT arithmetic unit 27 applies FFT processing to the time waveform signals input thereto and outputs N-number of carrier components. A demapping unit 28 performs demapping (processing that is the reverse of mapping) on a per-carrier basis and outputs M-bit parallel data, and a parallel/serial (P/S) converter 29 converts the M-bit parallel data to serial data and outputs the serial data.

A communication method having a maximum communication speed of 54 Mbps stipulated by IEEE 802.11b (ARIB STD T71) can no longer be deemed satisfactory when one considers a communication environment such as that of present-day wireless LANs. Meanwhile, the radio band of less than 5 GHz is already saturated and the situation is such that dedicated bandwidths of frequency cannot readily be enlarged. A wired LAN generally is implemented according to 100Base-TX (100 Mbps), and a wireless LAN system having a communication speed equivalent to this is required.

Methods of enlarging transmission capacity without changing the frequency band include a co-channel transmission method. According to co-channel transmission, polarization (horizontal polarization and vertical polarization) of radio waves is changed to perform selective communication in the same frequency band, and transmission speed is doubled overall, as illustrated in FIG. 14. In order to perform OFDM transmission by the co-channel transmission method, two OFDM transceivers are required. Cross-polarization interference occurs owing to a shift in antenna polarization angle. Further, cross-polarization interference occurs also owing to distortion in the transmission path conforming to rainfall and other factors. This makes it necessary to construct an OFDM transceiver in such a manner that such cross-polarization interference can be eliminated.

Orthogonality holds between adjacent carriers in OFDM. Accordingly, a carrier $C_A$ and an adjacent carrier $C_B$ are always in an orthogonal relationship, as illustrated at (a) of FIG. 15, and do not interfere with each other. Further, although interference occurs between the carrier $C_A$ and a carrier $C_D$, the carrier $C_A$ and a carrier $C_E$ are in an orthogonal relationship and interference between the polarized waves does not occur. Cross-polarization interference between the carrier $C_A$ and the carrier $C_D$ can be eliminated by interference compensation techniques using a conventional canceller.

However, when a phase deviation θ occurs between a vertically polarized wave and a horizontally polarized wave, as shown at (b) of FIG. 15, owing to a shift in antenna polarization angle, etc., interference is produced between the carrier $C_A$ and the carrier $C_D$ and between the carrier $C_A$ and the carrier $C_E$. This makes it necessary to eliminate the interference between the carriers $C_A$ and $C_D$ and the carriers $C_A$ and $C_E$ caused by the phase deviation.

Methods of interference compensation in a cochannel transmission scheme are disclosed in Japanese Patent Application Laid-Open No. 61-5642, Japanese Patent Application Laid-Open No. 5-48567 and Japanese Patent Application Laid-Open No. 6-181464. Further, OFDM transmission by a cochannel transmission scheme is disclosed in Japanese Patent Publication No. 8-504544 (Patent No. 3265578).

However, the interference compensating techniques disclosed in Japanese Patent Application Laid-Open No. 61-5642, Japanese Patent Application Laid-Open No. 5-48567 and Japanese Patent Application Laid-Open No. 6-181464, cannot eliminate interference between the carrier $C_A$ and the carrier $C_E$ caused by the phase deviation. Further, although Japanese Patent Publication No. 8-504544 (Patent No. 3265578) discloses that OFDM transmission is performed by a cochannel transmission scheme, there is no disclosure of a technique for eliminating interference between the carrier $C_A$ and the carrier $C_E$.

SUMMARY OF THE INVENTION

Accordingly, an object of the present invention is to so arrange it that a phase deviation between polarized waves will not occur.

Another object of the present invention is to simply the structure of a canceller for eliminating cross-polarization interference.

A first aspect of the present invention is an OFDM transmitter apparatus for transmitting signals, which are output from first and second OFDM transmit circuits, utilizing two mutually orthogonal polarized waves. In the OFDM transmitter apparatus, a single carrier wave generator is provided in common for the OFDM transmit circuits, and a frequency converter in each OFDM transmit circuit multiplies a baseband signal by a carrier wave, which is output from the carrier wave generator, to convert the baseband signal to a radio signal. In accordance with this OFDM transmitter apparatus, it can be so arranged that a phase deviation will not occur between a vertically polarized wave and a horizontally polarized wave by adopting a common transmit carrier wave in the first and second OFDM transmit circuits.

A second aspect of the present invention is an OFDM receiver apparatus having first and second OFDM receive circuits for demodulating respective ones of signals that have been transmitted utilizing two mutually orthogonal polarized waves. The OFDM receiver apparatus is such that a carrier wave generator is provided in common for the OFDM receive circuits, and a frequency converter in each OFDM receive circuit multiplies a radio signal by a carrier wave, which is output from the carrier wave generator, to convert the radio signal to a baseband signal, and inputs the baseband signal to a demodulator. By adopting a common carrier wave signal for the first and second OFDM receive circuits, it can be so arranged that a phase deviation will not occur between carriers obtained by frequency-conversion of high-frequency signals on vertically and horizontally polarized sides.

The OFDM receive circuits includes a demodulator for performing demodulation onto the baseband signal; an FFT arithmetic unit for applying FFT processing to a demodulated signal; an error signal generator for generating an error signal based upon each carrier signal obtained by the FFT processing; and a cross-polarization interference canceller for correcting an output signal of the demodulator by generating a cross-polarization interference compensating signal using the error signal and a demodulated signal from the other OFDM receive circuit. Cross-polarization interference caused by a shift in antenna polarization angle or distortion in the transmission path conforming to rainfall and other factors can be eliminated by the cross-polarization interference canceller.

The other OFDM receive circuit includes a demodulator for performing demodulation on to the baseband signal; an FFT arithmetic unit for applying FFT processing to a demodulated signal; an error signal generator for generating an error signal based upon each carrier signal obtained by the FFT processing; and a cross-polarization interference canceller for correcting each carrier signal of the FFT by generating a cross-polarization interference compensating signal using the error signal and a demodulated signal from the other OFDM receive circuit. By thus providing a cross-polarization interference canceller downstream of the FFT arithmetic unit, the speed per symbol of each carrier becomes 1/N, where N represents the number of carriers in the OFDM transmission, the amount of delay of interference waves becomes relatively small, the number of taps of a FIR constituting the canceller can be reduced and the scale of the circuitry can be reduced overall.

DESCRIPTION OF THE PREFERRED EMBODIMENTS (A) Principle of the Present Invention

Figure 1:
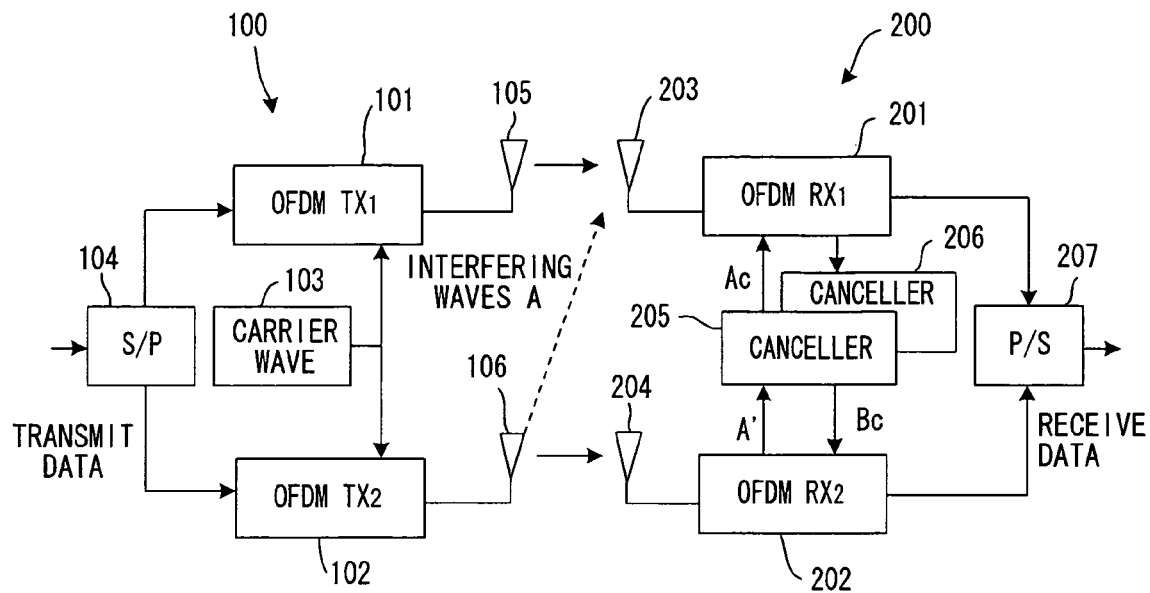
FIG. 1 is a diagram illustrating the principle of the present invention.

FIG. 1 is a diagram showing the principle of the present invention. An OFDM transmitter apparatus 100 includes first and second OFDM transmit circuits (OFDM TX1, OFDM TX2) 101, 102, the OFDM transmit circuits 101, 102 being provided with a shared carrier wave generator 103. A serial/parallel (S/P) converter 104 converts serial data to parallel data, inputs half the parallel data to the OFDM transmit circuit (OFDM TX1) 101 and inputs the other half to the OFDM transmit circuit (OFDM TX2) 102.

A frequency converter (not shown) in each of the OFDM transmit circuits 101, 102 multiplies the carrier wave that is output from the carrier wave generator 103 by a baseband signal, thereby effecting a conversion to a radio signal. The OFDM transmit circuit 101 transmits the radio signal from an antenna 105 by vertically polarized waves, and the OFDM transmit circuit 102 transmits the radio signal from an antenna 106 by horizontally polarized waves.

Figure 2:
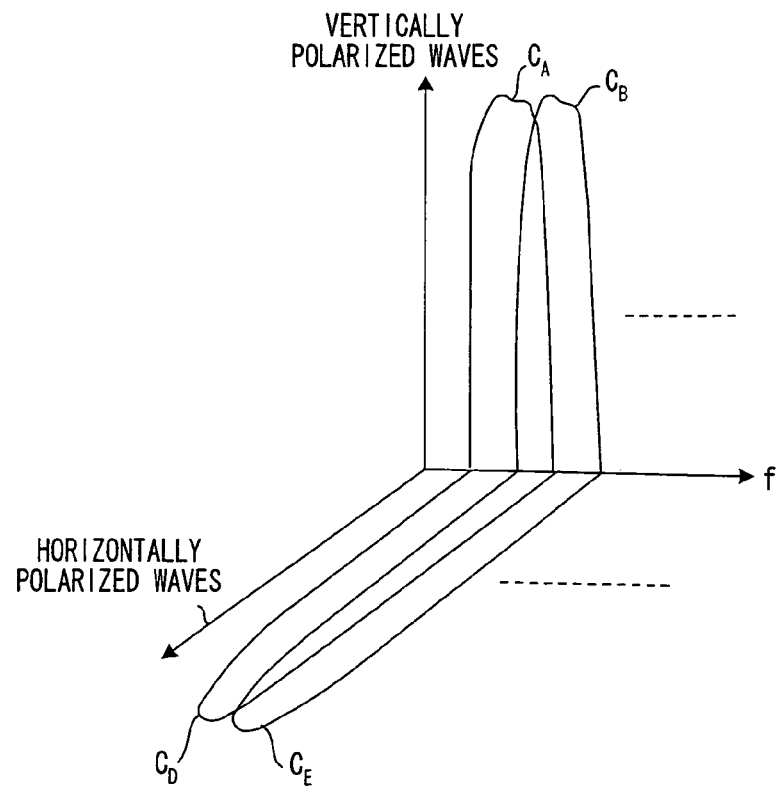
FIG. 2 is a diagram useful in describing vertically polarized waves and horizontally polarized waves in a case where a transmit carrier wave is shared.

In consideration of the orthogonality of adjacent carriers in OFDM, by adopting common cross-polarized carriers, it becomes possible to maintain the orthogonality between adjacent carriers even if cross-polarization interference occurs between differently polarized waves. That is, by adopting a common transmit carrier wave, it can be so arranged that a phase deviation will not occur between vertically and horizontally polarized waves, as illustrated in FIG. 2. As a result, the orthogonality between carriers $C_A$ and $C_E$ and between carriers $C_B$ and $C_D$ can be maintained and interference will not be produced between these carriers.

An OFDM receiver apparatus 200 includes first and second OFDM receive circuits 201, 202 for receiving signals, which have been transmitted utilizing two mutually orthogonal polarized waves, by antennas 203, 204, respectively, and for demodulating respective ones of these signals. The OFDM receive circuits 201, 202 are each provided with cross-polarization interference cancellers 205, 206. The cross-polarization interference cancellers 205, 206 share a transmit carrier wave or a receive carrier wave between polarized waves, thereby making it possible to extract and cancel a cross-polarization interference component. That is, the cross-polarization interference canceller 205 generates a cross-polarization interference compensating signal AC using the demodulated signal from the second OFDM receive circuit 202, and the first OFDM receive circuit 201 corrects the output signal of the demodulator using the cross-polarization interference compensating signal AC. Further, the cross-polarization interference canceller 206 generates a cross-polarization interference compensating signal BC using the demodulated signal from the first OFDM receive circuit 201, and the second OFDM receive circuit 202 corrects the output signal of the demodulator using the cross-polarization interference compensating signal BC. A parallel/serial converter 207 combines the parallel data that is output from the first and second OFDM receive circuits 201, 202, effects a conversion to serial data and outputs the serial data.

Orthogonality of adjacent carriers in OFDM is a well-known fact if the principle of a fast inverse discrete Fourier transform is utilized. Carrier $C_A$ and carrier $C_B$ in FIG. 2 are always in an orthogonal relationship and do not produce interference. Further, carrier $C_A$ and carrier $C_D$ give rise to interference between polarized waves, but in a case where a common transmit carrier wave was not used between the polarized waves, interference equivalent to the difference between the frequencies of the transmit carrier waves is produced between carrier $C_A$ and carrier $C_E$ as well. In order to prevent this, a common transmit carrier wave is adopted, thereby making it possible to maintain the orthogonality between carrier $C_A$ and carrier $C_E$. Further, cross-polarization interference between carrier $C_A$ and carrier $C_D$ is cancelled by the OFDM receive circuits 201, 202 by generating the cross-polarization interference compensating signals in the cross-polarization interference cancellers 205, 206, thereby making it possible to eliminate interference between cross-polarized waves.

It should be noted that by making at least one of the transmit carrier wave or receive carrier wave a shared carrier wave, an interference component A and an interference component A' become a common interference component, the cross-polarization interference compensating signal is generated by the canceller 205 and interference between differently polarized waves can be eliminated.

(B) OFDM Transmitter Apparatus

Figure 3:
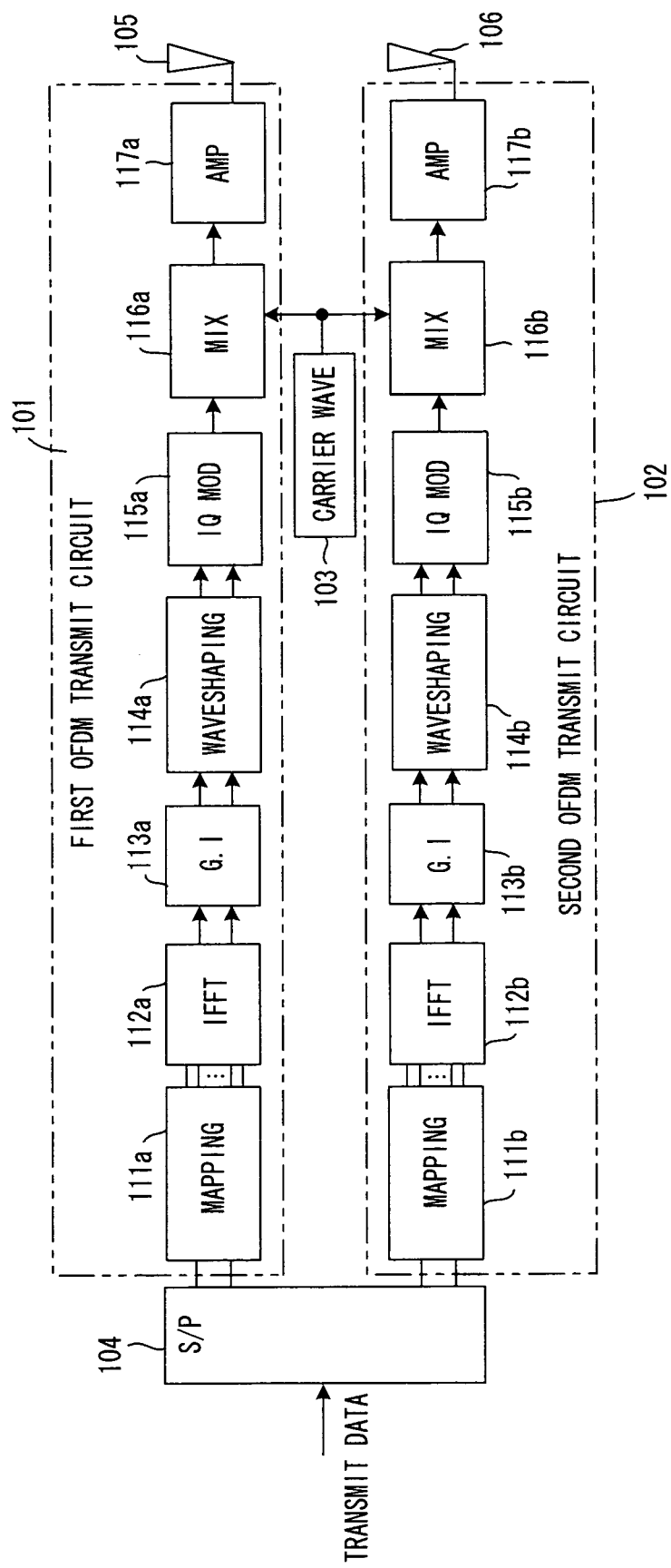
FIG. 3 is a diagram of the structure of an OFDM transmitter apparatus according to the present invention.

FIG. 3 is a diagram of the structure of an OFDM transmitter apparatus according to the present invention. Here components identical with those of in FIG. 1 are designated by like reference characters. The first and second OFDM transmit circuits 101, 102 transmit a transmit signal by an orthogonal polarization scheme, i.e., upon dividing the signal into two polarized waves (e.g., waves that differ by an angle of 90°).

The serial/parallel (S/P) converter 104 converts the transmit data, which enters in a serial format, to M-bit parallel data, inputs half the parallel data to the first OFDM transmit circuit 101 and inputs the other half to the OFDM transmit circuit 102.

Mapping units 111a, 111b map the M/2-bit parallel data to N-number of carriers based upon the carrier modulation method. For example, if QPSK modulation is performed by all carriers, then M/2-bit parallel data is divided into N sets of two bits each and the N sets of 2-bit data obtained by division are mapped to each carrier. In actuality, the mapping units 111a, 111b perform mapping based upon 4QAM~64QAM modulation schemes on the basis of the S/N ratio of each carrier.

IFFT arithmetic units 112a, 112b apply IFFT processing to the symbol data of the N carriers and effect a conversion to two time waveform signals (PCM waveform signals) of a real number (Ich component) and imaginary number (Qch) component. Guard interval inserting units 113a, 113b insert a GI (Guard Interval) into each signal, and waveshaping units 114a, 114b shape the waveforms and input the results to IQ modulators (QPSK quadrature modulators) 115a, 115b. The latter apply quadrature modulation to the Ich signal and Qch signal input thereto, and mixers 116a, 116b multiply the modulated signals of the baseband that are output from the quadrature modulators 115a, 115b by a high-frequency carrier wave that enters from the carrier wave generator 103, thereby performing a frequency conversion. Transmit amplifiers 117a, 117b amplify the transmit signals and transmit the amplified signals from antennas 105, 106 in such a manner that the polarization planes of the carrier waves are rendered mutually orthogonal.

In consideration of the orthogonality of adjacent carriers in OFDM, by adopting a common carrier wave between cross-polarized waves, it becomes possible to maintain the orthogonality between adjacent carriers even if cross-polarization interference occurs between differently polarized waves. That is, by adopting a common transmit carrier wave, it can be so arranged that a phase deviation will not occur between vertically and horizontally polarized waves, as illustrated in FIG. 2. As a result, the orthogonality between carriers $C_A$ and $C_E$ and between carriers $C_B$ and $C_D$ can be maintained and interference will not be produced between these carriers. Although interference does occur between carrier $C_A$ and carrier $C_D$ and between carrier $C_B$ and carrier $C_E$, this interference can be cancelled out using a canceller in the OFDM receiver apparatus in a manner similar to that of the prior art.

(C) OFDM Receiver Apparatus

Figure 4:
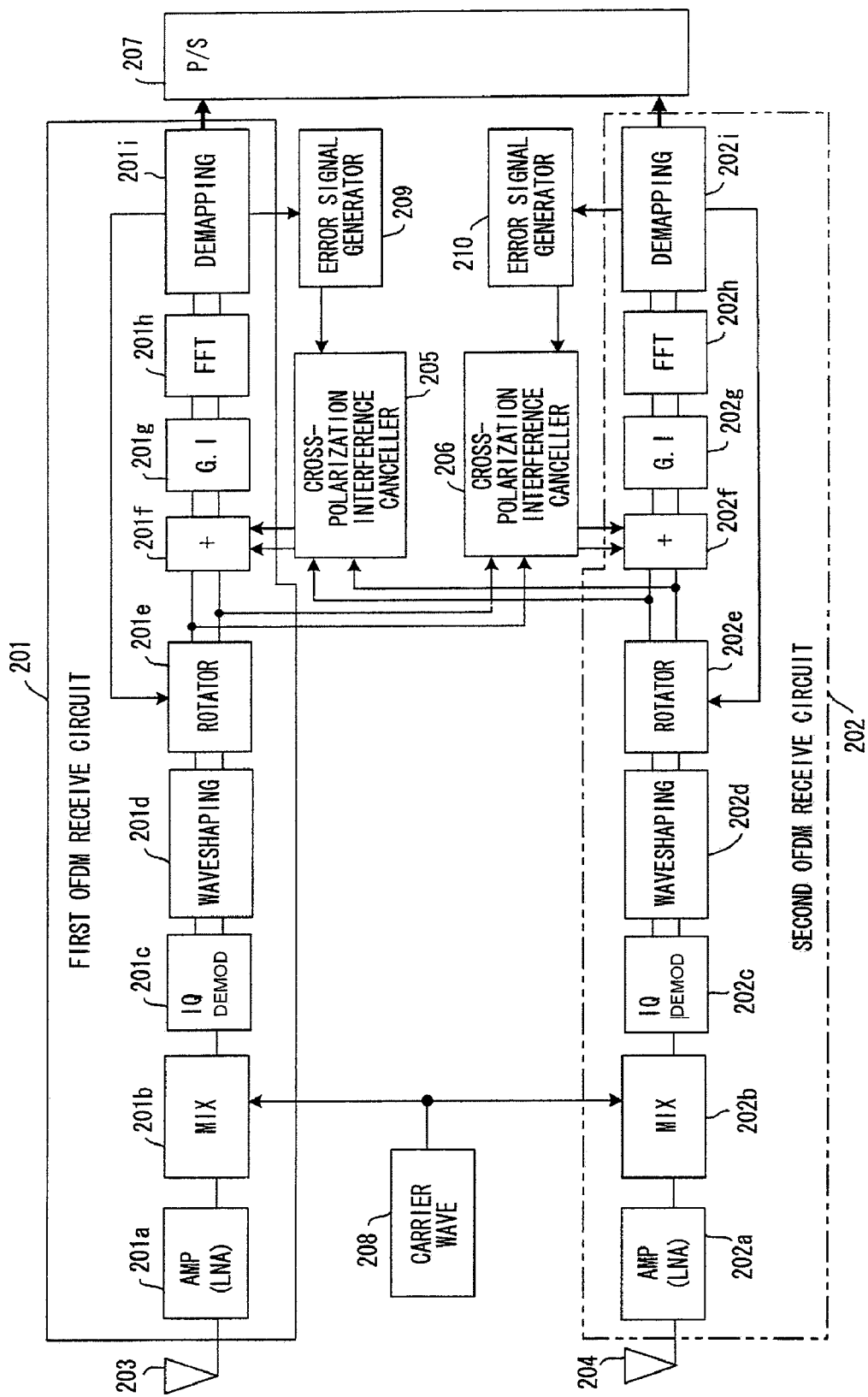
FIG. 4 is a diagram of the structure of an OFDM receiver apparatus according to the present invention.

FIG. 4 is a diagram of the structure of an OFDM receiver apparatus according to the present invention. Components identical with those shown in FIG. 1 are designated by like reference characters.

LNA (low-noise amplifier) units 201a, 202a of the first and second OFDM receive circuits 201, 202 amplify receive signals from two antennas 203, 204 having different polarizations, and mixers 201b, 202b multiply the receive signals by a high-frequency carrier wave that enters from a carrier wave generator 208, thereby effecting a frequency conversion to baseband signals, and input the baseband signals to IQ demodulators (QPSK quadrature demodulators) 201c, 202c. It should be noted that the mixers 201b, 202b perform the frequency conversion using the receive carrier wave, which is output from the carrier wave generator 208, in order to generate the baseband signals. However, since this carrier wave is made the same as the transmit carrier wave (see FIG. 3), a common carrier wave or a different carrier wave may be used as the receive carrier wave with respect to the two polarizations. If the transmit carrier wave is not made the common carrier, then it is necessary to make the receive carrier wave the common carrier.

Quadrature demodulators 201c, 202c subject the input signals to quadrature demodulation to thereby demodulate and output the Ich signal and Qch signal. Waveshaping units 201d, 202d shape the waveforms of respective ones of the signals and input the results to rotators 201e, 202e. The latter detect phase-error information from known pilot signals and rotate the phase of the inputs in such a manner that phase error becomes zero.

The cross-polarization interference canceller 205 generates a cross-polarization interference compensating signal using the demodulated signal from the second OFDM receive circuit 202 (the output signal of the rotator 202e) and an error signal, described later. An adder 201f eliminates interference by subtracting the cross-polarization interference compensating signal from the output signal of the rotator 201e. Similarly, the cross-polarization interference canceller 206 generates a cross-polarization interference compensating signal using the demodulated signal from the first OFDM receive circuit 201 (the output signal of the rotator 201e) and the error signal, and an adder 202f eliminates interference by subtracting the cross-polarization interference compensating signal from the output signal of the rotator 202e.

GI removing units 201g, 202g remove the GI (Guard Interval) from the I, Q components of the signals from interference has been eliminated, and FFT arithmetic units 201h, 202h apply FFT processing to the input time-waveform signals and output N-number of carrier components. Demapping units 201i, 202i perform demapping (processing that is the reverse of mapping) on a per-carrier basis and output M/2-bit parallel data. A parallel/serial (P/S) converter 207 converts M-bit parallel data to serial data and outputs the serial data.

Error signal generators 209, 210 produce error signals of the demapped pilot signal and input the error signals to the cross-polarization interference cancellers 205, 206.

Figure 5:
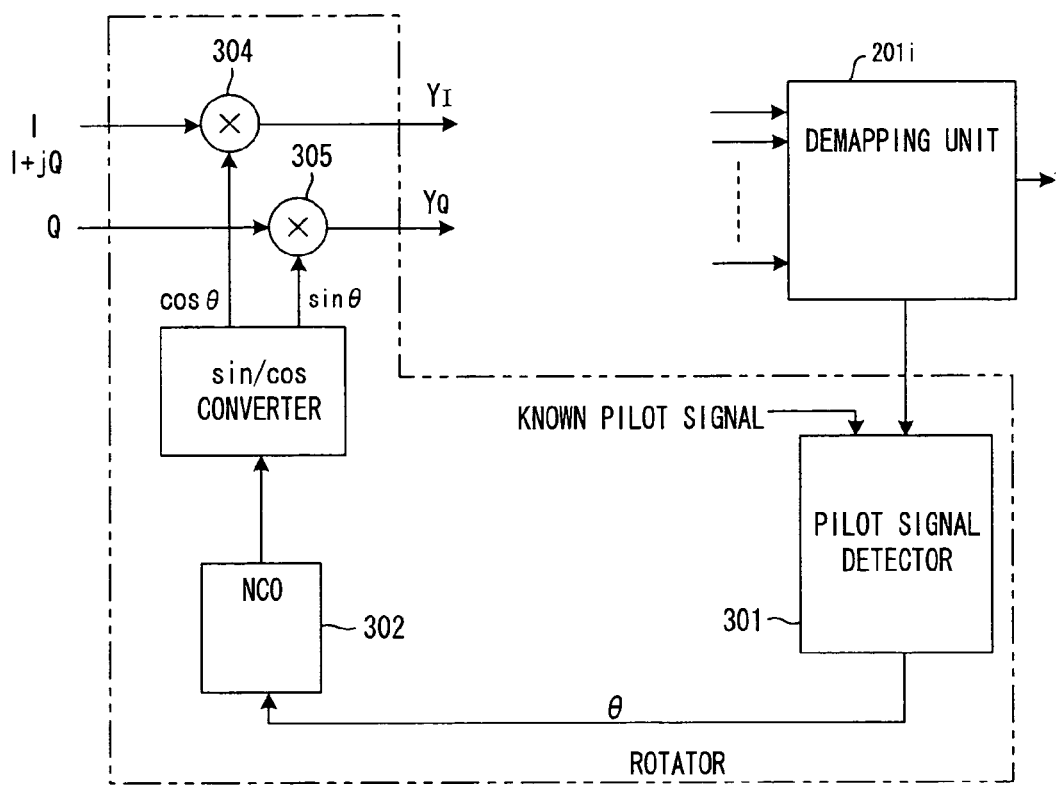
FIG. 5 is a diagram of the structure of a rotator.

FIG. 5 is a diagram showing the structure of the rotators 201e, 202e. A pilot signal detector 301 detects the pilot signal that is output from a demapping unit 201i, compares the detected pilot signal and a known pilot signal to find a phase error θ, controls an NCO (numerically controlled oscillator) 302 in such a manner that the phase error becomes zero, and generates cos θ, sin θ from a sin/cos converter 303. Multipliers 304, 305 respectively multiply cos θ, sin θ by the Ich, and Qch signals, which are output from the waveshaping circuit 201d. As a result, phase rotation that has developed along the transmission path is restored to what it was.

Figure 6:
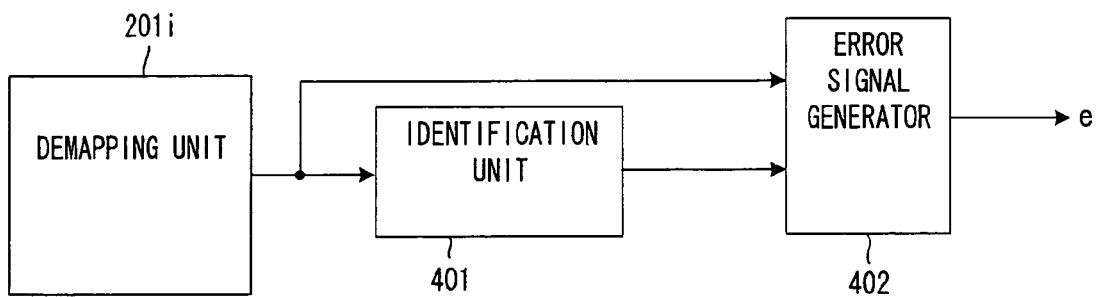
FIG. 6 is a diagram of the structure of an error signal generator.

FIG. 6 is a diagram of the structure of the error signal generators 209, 210. An identification unit 401 renders a hard decision regarding demapping data of a prescribed carrier, e.g., a pilot carrier, and an error signal generator 402 compares the demapping data (soft-decision data) and hard-decision data and generates an error signal e.

Figure 7:
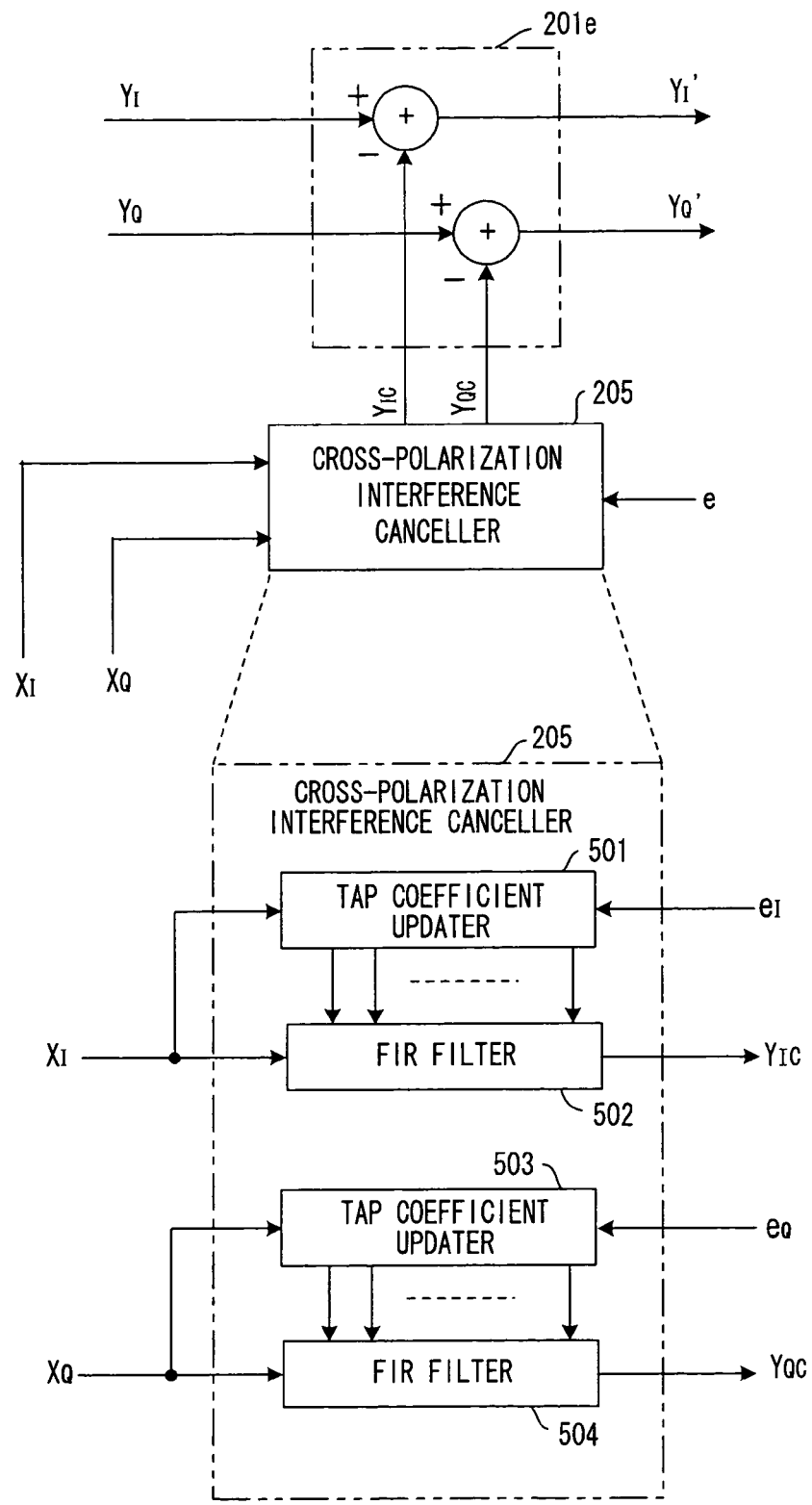
FIG. 7 is a diagram of the structure of a cross-polarization interference canceller.

FIG. 7 is a diagram of the structure of the cross-polarization interference canceller 205. The cross-polarization interference canceller 206 also has a similar structure. The cross-polarization interference canceller 205, which is constituted by a transversal filter, generates cross-polarization interference compensating signals $Y_{IC}$, $Y_{QC}$ of Ich, Qch, and an adder 201f adds the cross-polarization interference compensating signals $Y_{IC}$, $Y_{QC}$ to Ich signal $Y_I$ and Qch signal $Y_Q$, thereby eliminating the interference components.

The cross-polarization interference canceller 205 has a tap coefficient updater 501 and a FIR filter 502 in order to generate the cross-polarization interference compensating signal $Y_{IC}$ of Ich, and a tap coefficient updater 503 and a FIR filter 504 in order to generate the cross-polarization interference compensating signal $Y_{QC}$ of Qch.

The tap coefficient updater 501 updates tap coefficients based upon an Ich signal $X_I$ of different polarization and an Ich component $e_I$ of an error signal and sets the tap coefficients in the FIR filter 502. The FIR filter 502 performs a convolutional operation between the Ich signal $X_I$ and tap coefficients, thereby generating the interference compensating signal $Y_{IC}$ of Ich.

The tap coefficient updater 503 updates tap coefficients based upon a Qch signal $X_I$ of different polarization and a Qch component $e_Q$ of the error signal and sets the tap coefficients in the FIR filter 504. The FIR filter 504 performs a convolutional operation between the Qch signal $X_Q$ and tap coefficients, thereby generating the interference compensating signal $Y_{QC}$ of Qch.

Cross-polarization interference caused by a shift in antenna polarization angle or distortion in the transmission path conforming to rainfall and other factors can be eliminated by the cross-polarization interference canceller.

(D) Alternative Structure of OFDM Receiver Apparatus

Figure 8:
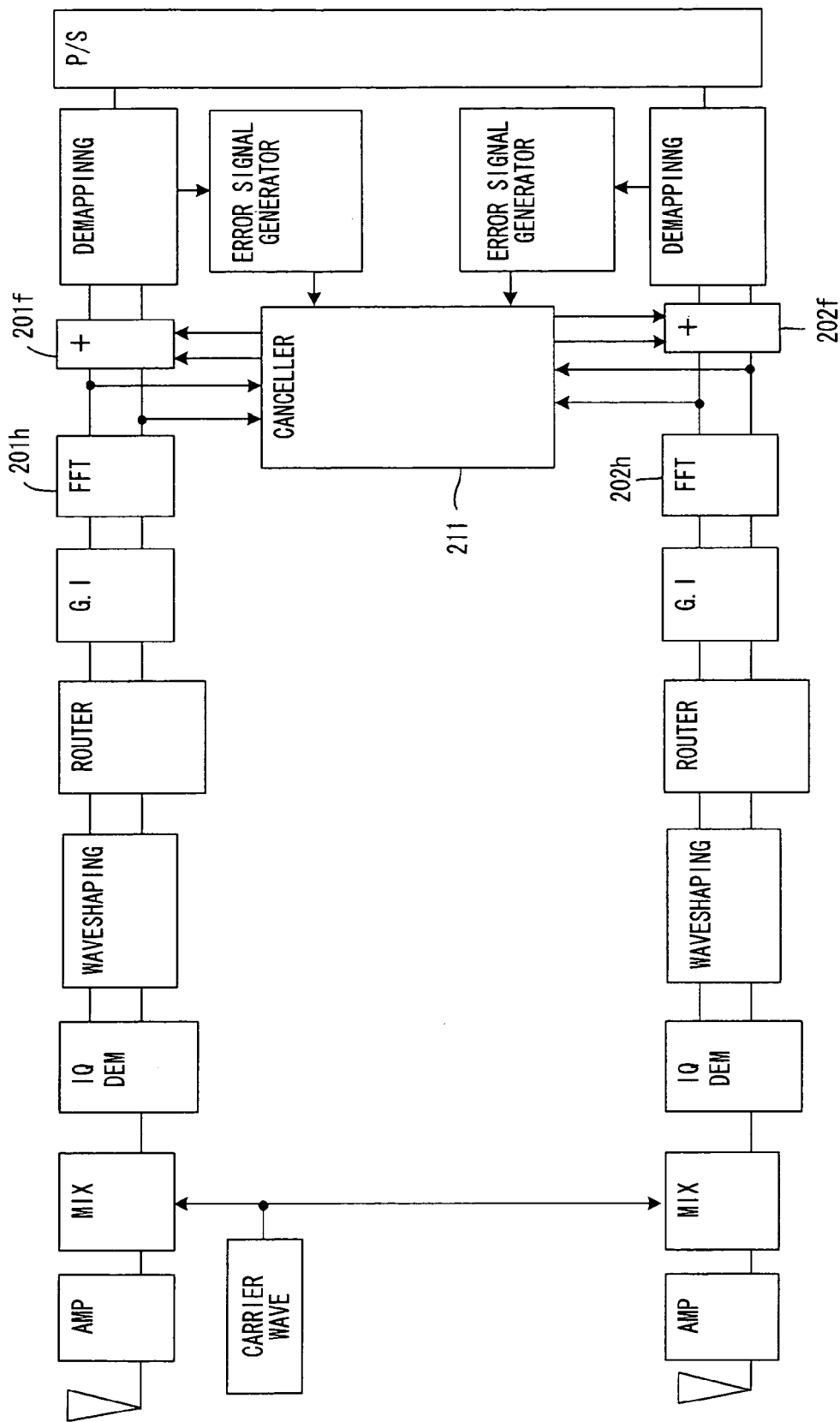
FIG. 8 illustrates another example of the structure of an OFDM receiver apparatus.
Figure 9:
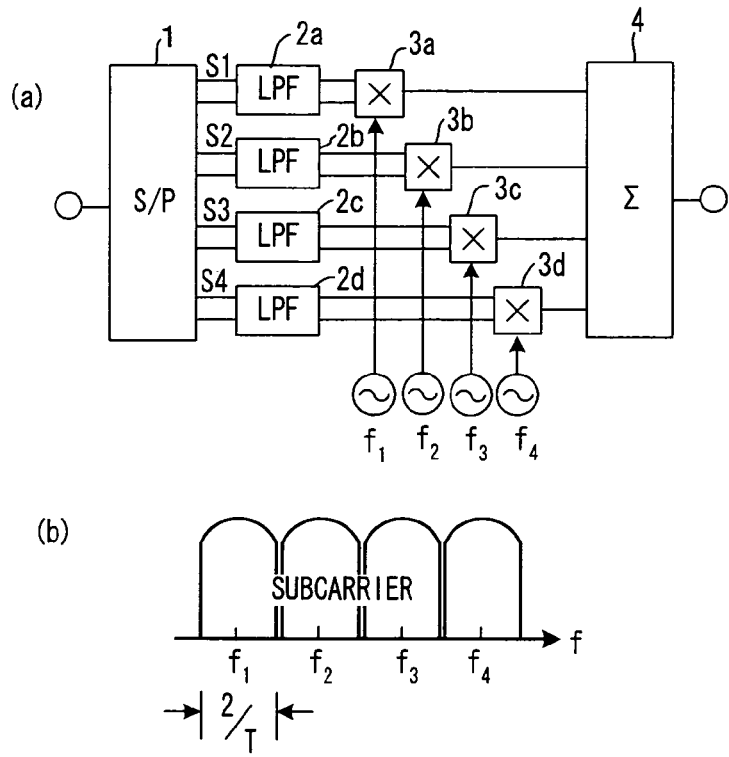
FIG. 9 is a diagram useful in describing a multicarrier transmission scheme.
Figure 10:
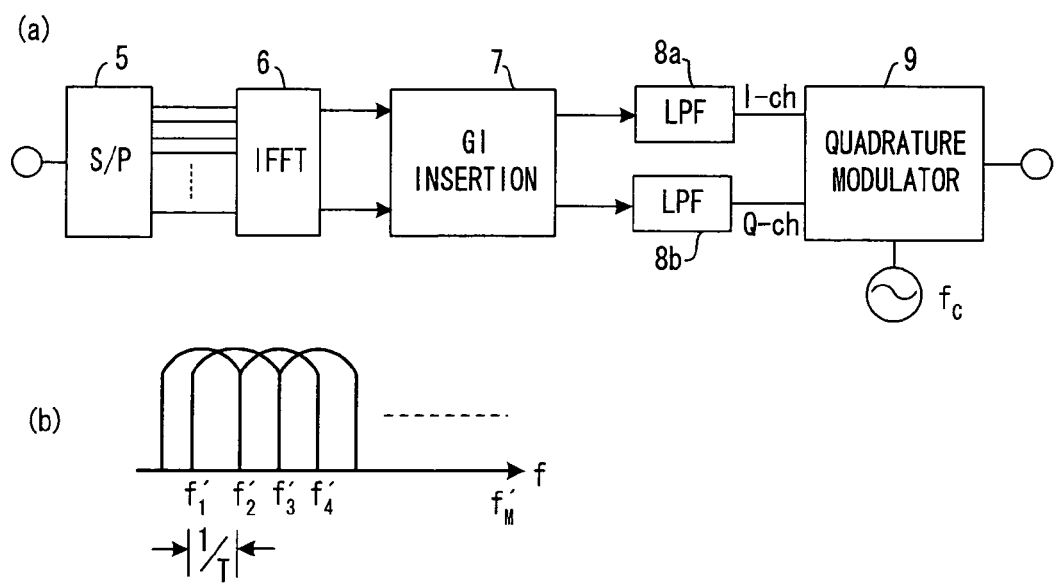
FIG. 10 is a diagram useful in describing an OFDM transmission scheme.
Figure 11:
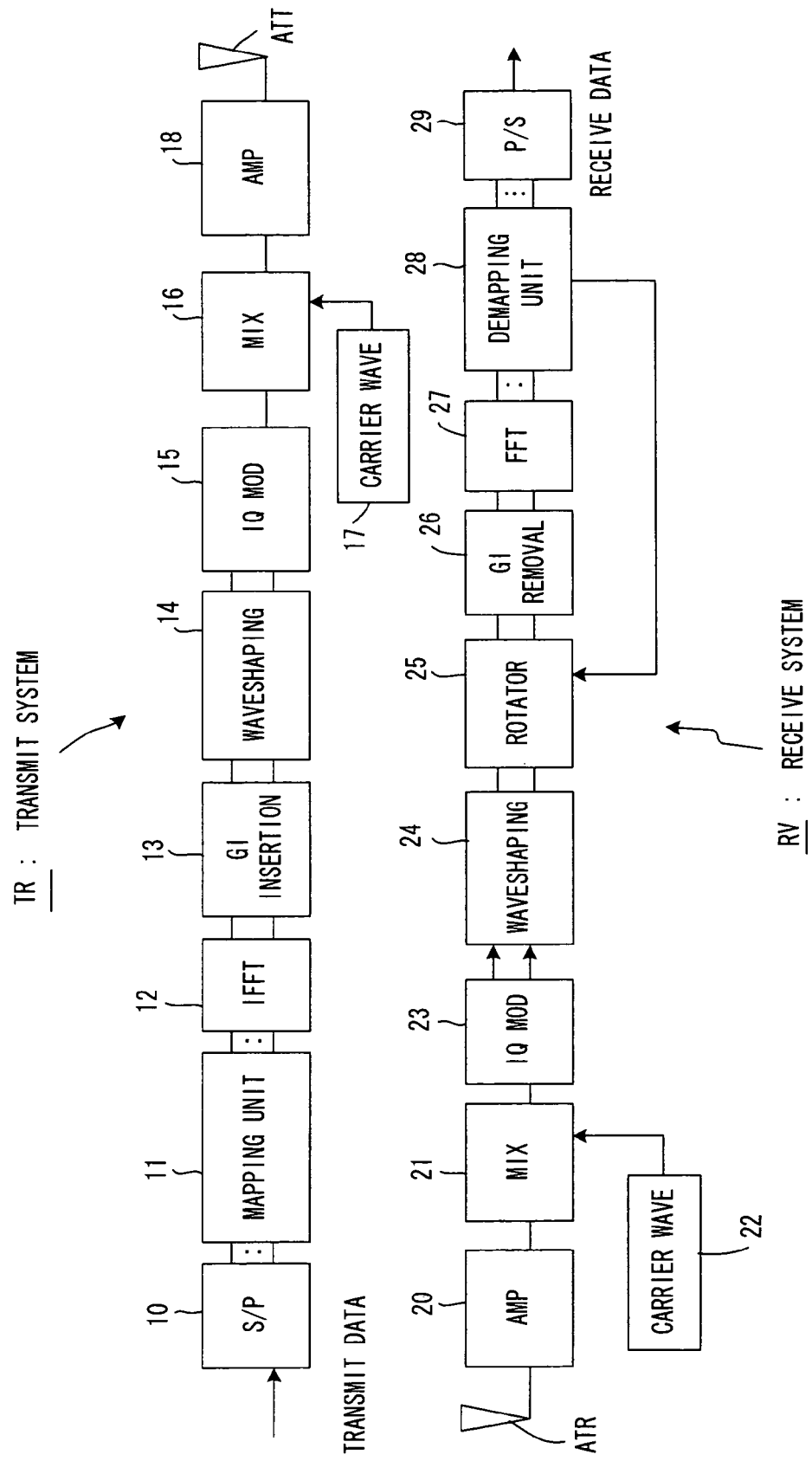
FIG. 11 is a diagram showing the conventional structure of an Orthogonal Frequency Division Multiplex (OFDM) communication apparatus.
Figure 12:
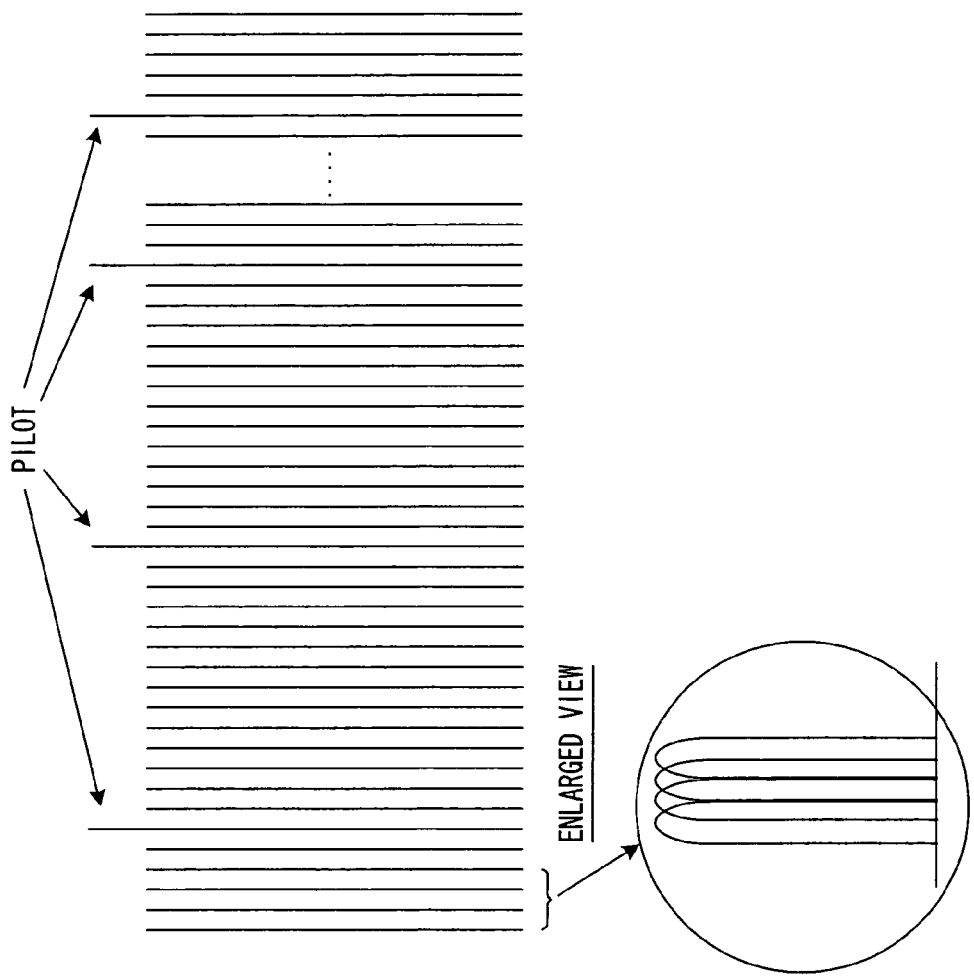
FIG. 12 is a diagram useful in describing carrier placement.
Figure 13:
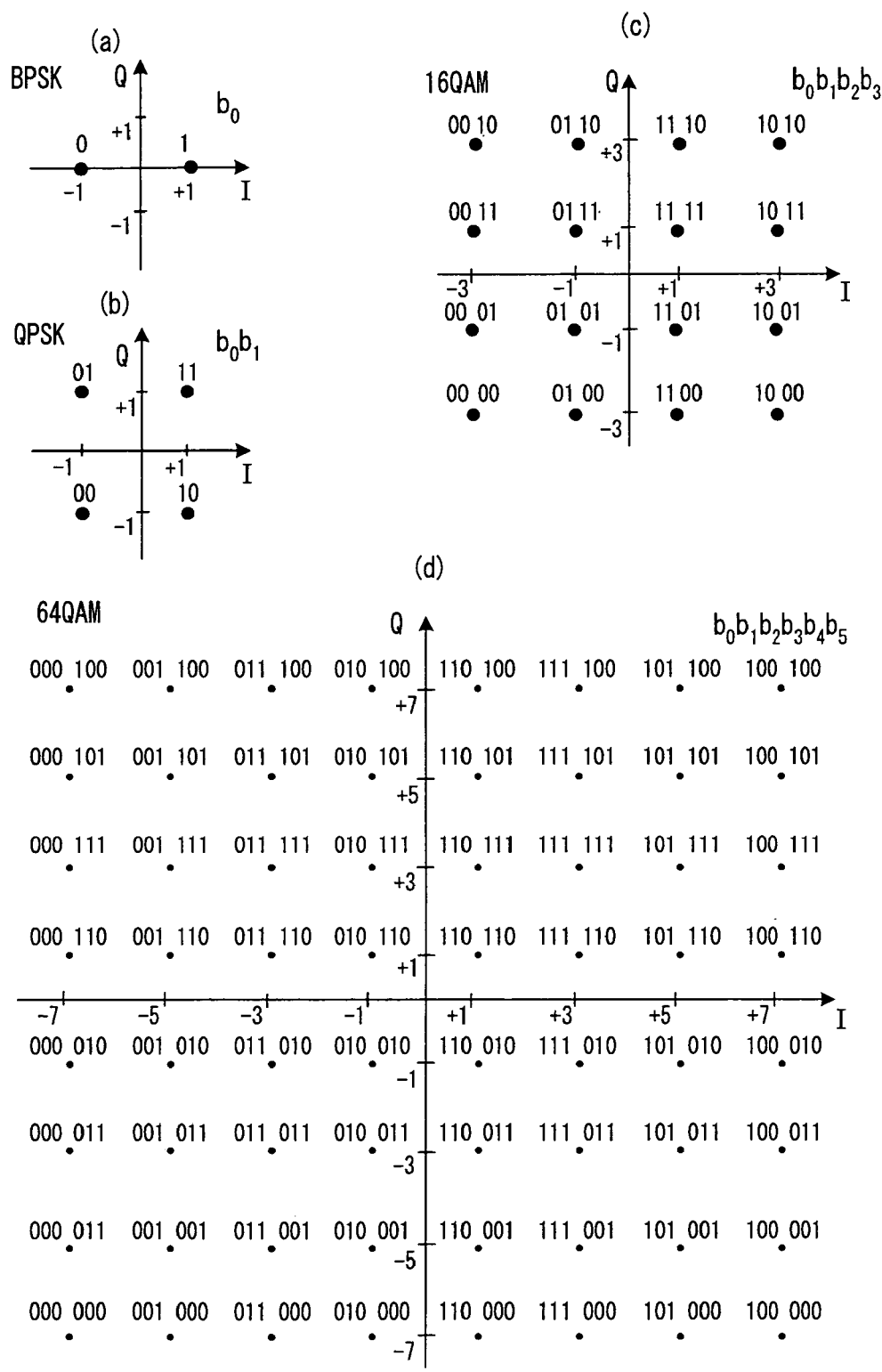
FIG. 13 is a diagram of signal-point placement for describing mapping.
Figure 14:
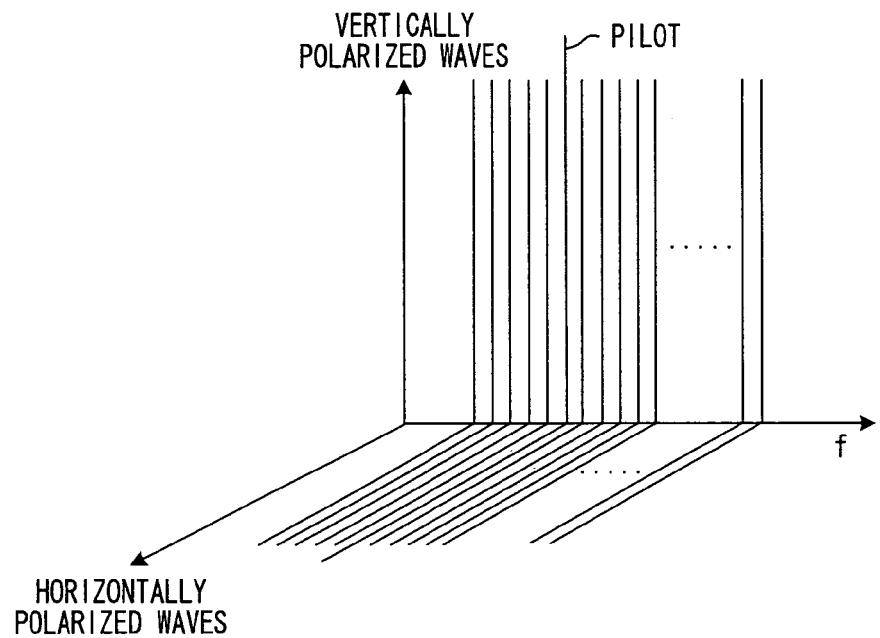
FIG. 14 is a diagram useful in describing polarized waves (horizontally polarized waves and vertically polarized waves) in co-channel transmission.
Figure 15:
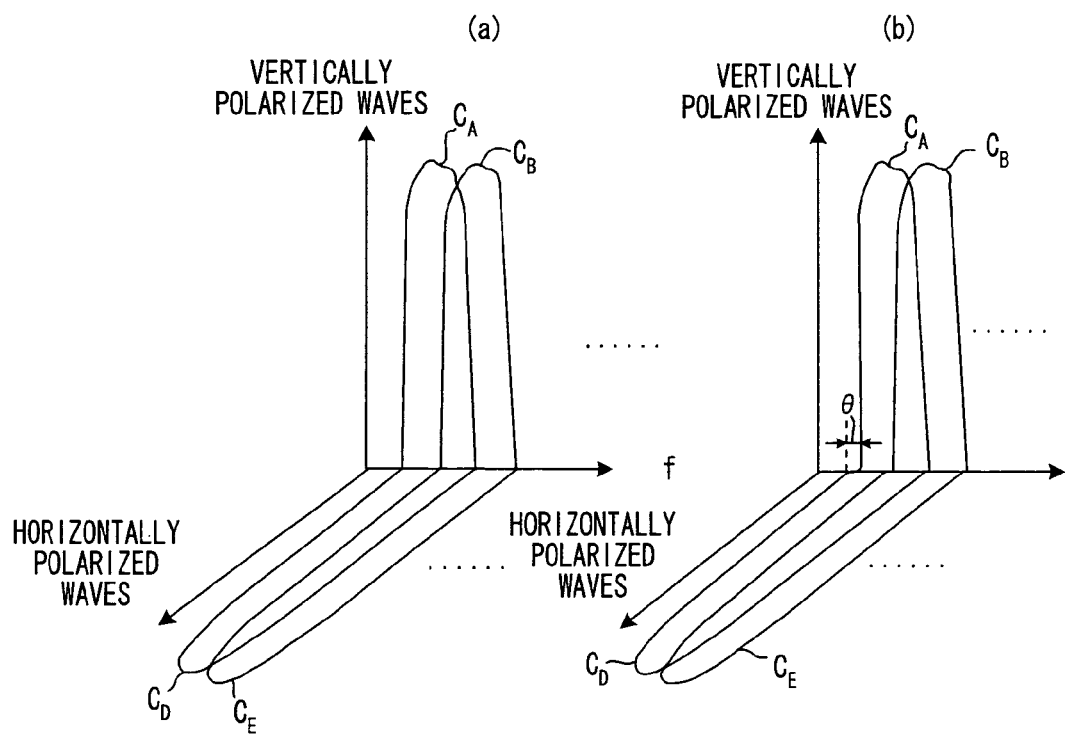
FIG. 15 is a diagram useful in describing the orthogonal relationship between horizontally polarized waves and vertically polarized waves in the prior art.

FIG. 8 illustrates another example of the structure of an OFDM receiver apparatus. Here components identical with those of the OFDM receiver apparatus in FIG. 4 are designated by like reference characters. This structure differs in that it is adapted in such a manner that the cancellation of cross-polarization interference is performed after the FFT operation. Specifically, this structure differs in that:

① the cross-polarization interference cancellers 205, 206 of FIG. 4 are consolidated into a canceller 211; and ② the canceller 211 and adders 201f, 202f are provided downstream of the FFT arithmetic units 201h, 202h.

Since the transmit carrier is the same, interference elimination only between vertically corresponding carriers need only be performed between cross-polarized waves, as in the manner of carriers $C_A$ and $C_D$ and carriers $C_B$ and $C_E$ in FIG. 2. The reason is that carriers that are not vertically corresponding do not interfere.

Accordingly, after a conversion is made to the carrier components in the FFT arithmetic units 201h, 202h, as shown in FIG. 8, cross-polarization interference can be eliminated carrier by carrier.

An effect according to the arrangement of FIG. 8 is that since the data speed of each carrier can be slowed down, the period per symbol slows down and the amount of delay of interference ascribable to multipath becomes relatively small. If the clock frequency is 10 MHz and the number of carriers is 48, the data speed per carrier becomes ⅟48 and therefore the period becomes 5 μs, which is 48 times 100 ns. Delay due to multipath is on the order of several microseconds, though this depends upon the radio-wave environment. In other words, for interference between symbols, a FIR filter of ten symbols becomes necessary in the canceller if 1-μs multipath occurs in a case where the symbol period is 100 ns. However, if the period is 6 μs, a FIR filter on the order of one symbol or two symbols is sufficient. By thus lowering the data speed, the scale of the canceller circuitry can be reduced by a wide margin. Accordingly, by using the cross-polarization interference compensating signal that is output from the canceller in common for each carrier, the overall circuit structure can be simplified.

Thus, in accordance with the present invention, it can be so arranged that a phase deviation will not occur between a vertically polarized wave and a horizontally polarized wave by adopting a common transmit carrier wave in first and second OFDM transmit circuits.

Further, in accordance with the present invention, it can be so arranged that a phase deviation will not occur between carrier signals obtained by frequency-converting high-frequency signals on vertically and horizontally polarized sides by adopting a common carrier wave in first and second OFDM receiver circuits.

Further, in accordance with the present invention, cross-polarization interference caused by a shift in antenna polarization angle or distortion in the transmission path conforming to rainfall and other factors can be eliminated by a cross-polarization interference canceller.

Further, in accordance with the present invention, by thus providing a cross-polarization interference canceller downstream of an FFT arithmetic unit, the speed per symbol of each carrier becomes 1/N, where N represents the number of carriers, the amount of delay of interference waves becomes relatively small, the number of taps of a FIR constituting the canceller can be reduced and the scale of the circuitry can be reduced overall.

What is claimed is:

1. An Orthogonal Frequency Division Multiplexing (OFDM) receiver apparatus having first and second OFDM receive circuits for demodulating respective ones of signals that have been transmitted utilizing two mutually orthogonal polarized waves, comprising:
    a single carrier wave generator provided in common for the OFDM receive circuits; and
    a frequency converter provided in each OFDM receive circuit for multiplying a radio signal by a carrier wave, which is output from said carrier wave generator to convert the radio signal to a baseband signal, and inputs said baseband signal to a demodulator provided in each OFDM receive circuit, wherein said OFDM receive circuits include:
    said demodulator for performing demodulation onto said baseband signal;
    a Fast Fourier Transform (FFT) arithmetic unit for applying FFT processing to the demodulated signal;
    an error signal generator for generating an error signal based upon each carrier signal obtained by the FFT arithmetic unit;
    a cross-polarization interference canceller for generating a cross-polarization interference compensating signal using said error signal and a demodulated signal from the other OFDM receive circuit; and
    a correcting unit for correcting an output signal of said demodulator by adding the cross-polarization interference compensating signal to said output signal.

2. An Orthogonal Frequency Division Multiplexing (OFDM) receiver apparatus having first and second OFDM receive circuits for demodulating respective ones of signals that have been transmitted utilizing two mutually orthogonal polarized waves, comprising:
    a single carrier wave generator provided in common for the OFDM receive circuits; and
    a frequency converter provided in each OFDM receive circuit for multiplying a radio signal by a carrier wave, which is output from said carrier wave generator to convert the radio signal to a baseband signal, and inputs said baseband signal to a demodulator provided in each OFDM receive circuit, wherein said OFDM receive circuits include:
    said demodulator for performing demodulation onto said baseband signal;
    a Fast Fourier Transform (FFT) arithmetic unit for applying FFT processing to the demodulated signal;
    an error signal generator for generating an error signal based upon each carrier signal obtained by the FFT arithmetic unit;
    a cross-polarization interference canceller for generating a cross-polarization interference compensating signal using said error signal and a demodulated signal from the other OFDM receive circuit; and
    a correcting unit for correcting each carrier signal of said FFT arithmetic unit by adding the cross-polarization interference compensating signal to said each carrier signal.

3. An Orthogonal Frequency Division Multiplexing (OFDM) receiver apparatus having first and second OFDM receive circuits for demodulating respective ones of signals that have been transmitted utilizing two mutually orthogonal polarized waves, wherein said OFDM receive circuits include:

- a frequency converter for multiplying a radio signal by a carrier wave to convert the radio signal to a baseband signal;
- a demodulator for performing demodulation onto said baseband signal;
- a Fast Fourier Transform (FFT) arithmetic unit for applying FFT processing to a demodulated signal;
- an error signal generator for generating an error signal based upon each carrier signal obtained by the FFT arithmetic unit;
- a cross-polarization interference compensating canceller for generating a cross-polarization interference compensating signal using said error signal and a signal obtained by applying FFT processing to a demodulated signal of the other OFDM receive circuit; and
- a correcting unit for correcting each carrier signal, which is output from said FFT arithmetic unit, by adding the cross-polarization interference compensating signal to said each carrier signal.

* * * * *

UNITED STATES PATENT AND TRADEMARK OFFICE
CERTIFICATE OF CORRECTION

PATENT NO.         : 7,551,678 B2
APPLICATION NO.    : 11/094783
DATED              : June 23, 2009
INVENTOR(S)        : Hiroyuki Kiyanagi et al.

It is certified that error appears in the above-identified patent and that said Letters Patent is hereby corrected as shown below:

Title Page, item (75) should read as follows:

(75) Inventors: Hiroyuki Kiyanagi, Sapporo (JP);
Mitsuo Kobayashi, Sapporo (JP);
Shinya Ohkawa, Sendai (JP);
Takanori Iwamatsu, Kawasaki (JP)

Signed and Sealed this

Twenty-second Day of September, 2009

David J. Kappos
*Director of the United States Patent and Trademark Office*